United States Patent [19]

Hutchinson

[11] Patent Number: 5,287,053
[45] Date of Patent: Feb. 15, 1994

[54] POWER SUPPLY WITH A BATTERY DISCONNECT

[75] Inventor: Kenneth S. Hutchinson, Cary, Ill.

[73] Assignee: Motorola, Inc., Schaumburg, Ill.

[21] Appl. No.: 909,272

[22] Filed: Jul. 6, 1992

[51] Int. Cl.[5] .......................... H02J 7/10; H02J 9/04; H02J 9/06
[52] U.S. Cl. ........................................ 320/2; 320/3; 320/15; 307/66
[58] Field of Search .................... 320/2, 3, 15; 307/66

[56] References Cited

U.S. PATENT DOCUMENTS

| | | | |
|---|---|---|---|
| 4,395,639 | 5/1982 | Bring | 307/64 |
| 4,577,144 | 10/1984 | Hodgman et al. | 320/2 |
| 4,577,145 | 10/1984 | Mullersman | 320/2 |
| 4,628,243 | 10/1984 | Hodgman et al. | 320/2 |
| 4,707,618 | 6/1986 | Haas | 307/66 |
| 5,057,697 | 3/1990 | Hammond et al. | 307/66 |
| 5,160,851 | 11/1992 | McAndrews | 307/66 |
| 5,185,536 | 2/1993 | Johnson, Jr. et al. | 307/66 |
| 5,206,538 | 4/1993 | Orta | 307/66 |

Primary Examiner—R. J. Hickey
Attorney, Agent, or Firm—Phillip H. Melamed; John H. Moore

[57] ABSTRACT

A power supply with a battery disconnect has battery power terminals (105, 109), and a charging terminal (121). The battery power terminals are for receiving battery power from a to be provided battery (111, 119). External power terminals (103, 107) are also provided for receiving external power from a to be provided external power source (115). A charging circuit (137) provides a charge path between the external power terminal (103) to the charging terminal (121). A gate (113), has an input (123) coupled to the external power terminal (103), an output (125) coupled to the battery power terminal (109), and a control input (127) coupled to the external power terminal (107). The output (125) of the gate (113) is decoupled from the input (123), responsive to the connection of the external power source (115). The battery power terminal (105), the external power terminals (103, 107) and the input (123) of the gate (113) are combined and provide operative power to a load (101) from either the external power source (115) through the external power terminals (103, 107), or the battery (111, 119) through the battery power terminal (105) and the input (123) of the gate (113). Simultaneously, the gate (113) and the charging terminal (137) permit the charging of a secondary battery (119) coupled to the charging terminal (121) and the battery power terminals (105, 109), responsive to the connection of the external power source (115), and the gate (113) prevents the charging of a primary battery (111) connected to the battery power terminals (105, 109), responsive to the connection of the external power source (115).

19 Claims, 1 Drawing Sheet

POWER SUPPLY WITH A BATTERY DISCONNECT

FIELD OF THE INVENTION

This invention is generally directed to the field of equipment power supplies and more specifically to portable equipment having both externally provided operative power and battery pack provided operative power with battery charging capability.

BACKGROUND OF THE INVENTION

Portable equipment is often provided operative power from power packs constructed of primary batteries or secondary batteries. If the equipment is in a location with fixed power available, the equipment may be provided operative power by an external power source. Simultaneously with providing operative power from the external power source it is also desirable to charge the secondary batteries, if they are disposed in the power pack. If primary batteries are disposed in the power pack the external power source must not attempt to charge these batteries. This is because primary batteries can be irreversibly damaged and in some cases may explode, if there is an attempt to charge these primary batteries.

Prior solutions to this problem have either warned the user not to install primary batteries when external power is connected, or used mechanically interlocked power receptacles. These mechanically interlocked power receptacles connect the external power to the load while disconnecting the battery power from the load. The problem with this approach is that the disconnect mechanism is subject to physical wear and further is very difficult to seal. Without an adequate seal the electrical circuitry internal to the portable equipment can be damaged. Further, with this approach, if secondary batteries are installed they will not be charged simultaneously with the external power source providing operative power.

What is needed is an improved portable equipment power supply with provision for externally provided power to provide operative power while charging a secondary battery power pack but preventing the charging of a primary battery power pack.

SUMMARY OF THE INVENTION

A power supply with a battery disconnect has battery power terminal means, including a charging terminal. The battery power terminal means receives battery power from a to be provided battery. Additionally, external power terminal means are provided for receiving external power from a to be provided external power source. Charging means provide a charge path between the external power terminal means and the charging terminal. A gate has an input coupled to the external power terminal means, an output coupled to the battery power terminal means, and a control input coupled to the external power terminal means. The output of the gate is decoupled from the input, responsive to a connection of the external power source to the external power terminals. The battery power terminal means, the external power terminal means, and the input of the gate are combined and provide operative power to a load from either the external power source through the external power terminal means, or the battery through the battery power terminal means and the input of the gate. The charging means permits the charging of a secondary battery coupled to the charging terminal and the battery power terminal means, responsive to the connection of the external power source, and the gate prevents the charging of a primary battery connected to the battery power terminal means, responsive to the connection of the external power source.

DETAILED DESCRIPTION OF A PREFERRED EMBODIMENT

Figure 1:
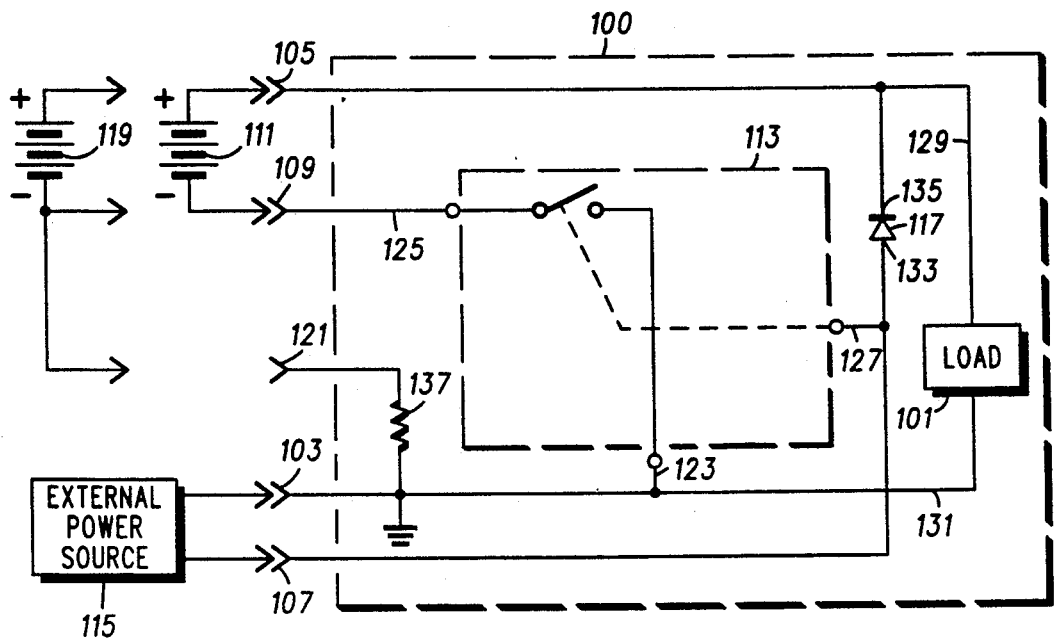
FIG. 1 is a schematic block diagram of a power supply with a battery disconnect, in accordance with the invention.

FIG. 1 shows a schematic block diagram of a power supply with a battery disconnect that overcomes the deficiencies of the prior art. As mentioned earlier, equipment represented by reference number 100 can be provided operative power from one of three sources. These include an external power source 115, a primary battery 111, or a secondary battery 119. Note that the term primary battery means that the battery is not rechargeable and the term secondary battery means that the battery is rechargeable. If the primary battery 111 is installed it should provide operative power to a load 101. If the secondary battery 119 is installed instead of the primary battery 111, it should provide operative power to the load 101. If the external power source 115 is connected, and energized, it should provide operative power to the load 101. Note that when the external power source 115 is connected is assumed to be energized, and disconnection of the external power source 115 is equivalent to denergizing it. If either the primary battery 111 or the secondary 119 battery is installed, it should be disconnected from providing operative power to the load if the external power source 115 is connected. Further, if the secondary battery 119 is installed it should be charged. Note that this assumes that the external power source 115 is of a voltage higher than the secondary battery 119. If the primary battery 111 is installed it should definitely not be charged. To this end the apparatus 100 is described as follows.

A positive battery terminal 105 is provided to connect to a positive terminal of either the primary 111 or the secondary 119 battery, for providing operative power to the load 101 at a first, or positive, load terminal 129. A negative battery terminal 109 provides a negative path for either the primary 111 or secondary 119 battery, for providing operative power to the load 101 at a second, or negative, load terminal 131. A third, or charge, terminal 121 is provided for a charge connection to the secondary battery 119. External power terminals including a positive external power terminal 107 and a negative external power terminal 103 are included for providing operative power to the load 101 from the external power source 115. A resistor 137 is coupled between the negative terminal 103 and the charge terminal 121 for providing a charge path for the secondary battery 119. A gate 113 has an input 123 connected to the negative load terminal 131, an output 125 connected to the negative battery terminal 109, and a control input 127 connected to the positive external power terminal 107. Responsive to the electrical connection of the external power source 115 to the terminals 103 and 107, the input 123 is disconnected from the output 125. A semiconductor diode 117 has an anode 133 connected to the positive external power terminal 107, and a cathode 135 connected to the positive load terminal 129 of the load 101.

If the primary battery 111 is installed, and the external power source 115 is not connected across terminals 103 and 107, the primary battery 111 will provide operative power to the load 101. This is because the gate 113, in the absence of connection of the external power source 115, is closed and therefore providing a connection between the negative battery terminal 109, the output 125, the input 123 and the negative load terminal 131. Note that the primary battery 111 is a two terminal device connecting a positive terminal to the positive battery terminal 105, and a negative terminal to the negative battery terminal 109. It occupies a lone power pack location on the equipment 100. Therefore, only one battery can be installed and connected at a time.

If the external power source 115 is connected to terminals 103 and 107, then the control input 127 of the gate 113 disconnects the input 123 from the output 125. This eliminates the primary battery 111 from providing operative power to the load 101. Since the primary battery 111 has only two terminals it is not connected to the charge terminal 121 and therefore there is no charging path. Therefore, the combination of no connection to the charge terminal 121 and the action of the gate 113 prevents the charging of the primary battery 111 while enabling the provision of providing operative power to the load 101 in the absence of the external power source 115.

If the secondary battery 119 is installed, instead of the primary battery 111, and the external power source 115 is not connected across terminals 103 and 107, the secondary battery 119 will provide operative power to the load 101. This is because the gate 113, in the absence of connection of the external power source 115, is closed and therefore providing a connection between the negative battery terminal 109, the output 125, the input 123 and the negative load terminal 131. If the external power source 115 is connected to terminals 103 and 107, then the control input 127 of the gate 113 disconnects the input 123 from the output 125. This eliminates the secondary battery 119 from providing operative power to the load 101.

The secondary battery 119 has a third terminal connected to the charge terminal 121. Because of this connection a charging path is provided through the resistor 137. Therefore, the combination of the charge terminal 121 and the action of the gate 113 enables the charging of the secondary battery 111 while enabling the provision of providing operative power to the load 101 by the secondary battery 119 in the absence of the external power source 115.

If the external power source 115 is connected it will provide operative power to the load 101. The operative power is provided through a path including the positive external power terminal 107, the diode 117, the positive load terminal 129, the negative load terminal 131 and the negative external power terminal 103. The diode 117 prevents either a primary battery 111 or a secondary battery 119 from controlling the control input 127 of the gate 113.

Figure 2:
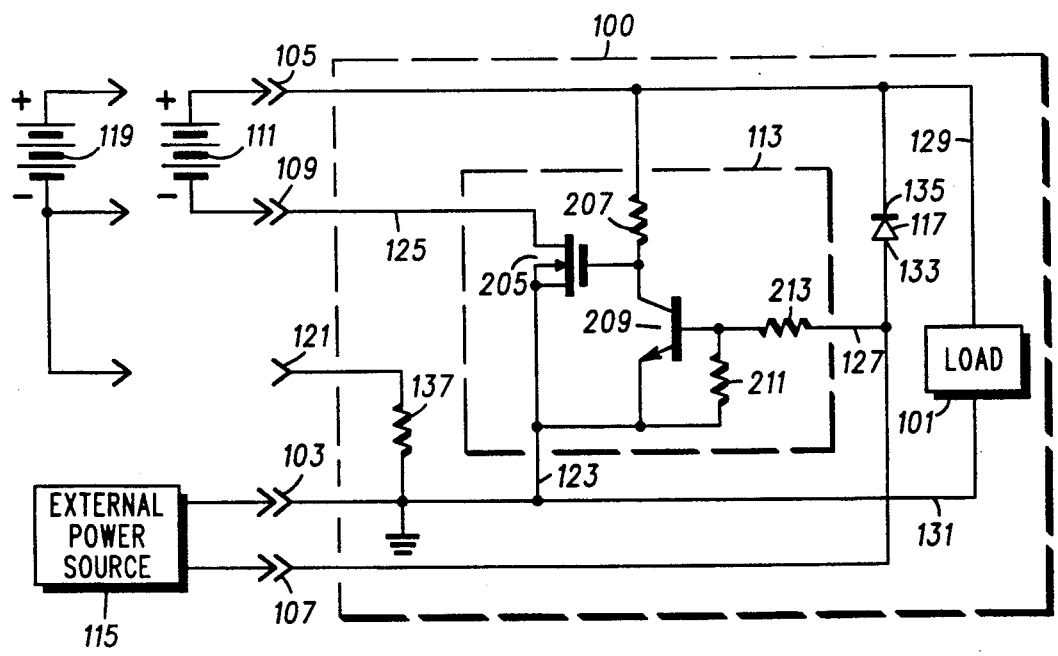
FIG. 2 is a schematic diagram illustrating further details of the schematic block diagram from FIG. 1.

FIG. 2 is a schematic diagram illustrating further details of the schematic block diagram from FIG. 1. In particular the gate 113 is further detailed including; a transistor 205, preferably an N-Channel FET, a resistor 207, an NPN transistor 209, a resistor 211, and a resistor 213. The purpose of the resistor 207 is to turn on, thereby saturating, the FET 205 if a either a primary battery 111 or a secondary battery 119 is present and the external power source 115 is not connected. When the FET 205 is turned on the gate 113 is closed and provides the connection between the negative battery terminal 109, the output 125, the input 123 and the negative load terminal 131. If an external power source 115 is connected to terminals 103 and 107, then the NPN transistor 209, driven by resistors 211 and 213 turns on, stealing voltage away from the FET 205—thus turning off, or cutting-off the FET 205 and opening the gate 113. This disconnets the input 123 from the output 125. This eliminates the primary battery 111 or secondary battery 119 from providing operative power to the load 101.

Finally, the completed apparatus is enclosed in a sealed housing. The positive battery terminal, the negative battery terminal, the charging terminal, the positive external power terminal, and the negative external power terminal are insertion molded into and provided external to the sealed housing. Preferably, these terminals are gold plated to prevent corrosion.

Of course, it would be obvious to one of ordinary skill in the art to change polarities of the circuit or to substitute other equivalent switch mechanisms and provide the same resulting benefits of the disclosed apparatus. Or substitute a means, other than a resistor, for charging the secondary battery 119.

The present apparatus 100 has overcome the deficiencies of the prior art because it is not subject to physical wear and is relatively easy to seal. This enables the protection of electrical circuitry internal to the equipment. Further, with this approach, if secondary batteries 119 are installed they will be charged simultaneously with the external power source 115 providing operative power to the load 101. And the same circuit prevents charging of the primary battery 111 if is installed in place of secondary battery 119. If either a secondary battery 119 or a primary battery 111 is installed, and the external power source 115 is absent the battery 111, 119 will provide operative power to the load 101.

What is claimed is:

1. A power supply with a battery disconnect comprising:
    battery power terminal means, including separate positive, negative and charging terminals, said battery power terminal means for receiving battery power from a to be provided battery;
    external power terminal means for receiving external power from a to be provided external power source;
    charging means for providing a charge path between said external power terminal means and the charging terminal of said battery power terminal means;
    gating means having an input, an output, and a control input, wherein the input is coupled to said external power terminal means, the output is coupled to one of the positive and negative terminals of said battery power terminal means, and the control input is coupled to said external power terminal means, and wherein the output is decoupled from the input responsive to connection of the external power source to the external power terminal means and wherein the output is coupled to the input, responsive to the disconnection of the external power source from the external power terminal means; and means for combining the battery power terminal means, the external power terminal means, and the input of said gating means, said combining means for providing operative power to a load from either the external power source through said external power terminal means, or the battery through said battery power terminal means and the input of said gating means, and wherein said charging means permits the charging of a secondary battery coupled to the charging terminal and at least another one of the positive and negative terminals of said battery power terminal means responsive to the connection of the external power source, and wherein said gating means prevents the charging of a primary battery connected to the positive and negative terminals of said battery power terminal means, by disconnecting the input and output of said gating means responsive to the connection of the external power source to said external power terminal means.

2. An apparatus in accordance with claim 1 wherein said means for combining includes means for isolating the control input of said gating means from said battery power terminal means.

3. An apparatus in accordance with claim 2 wherein said means for isolating comprises a semiconductor diode.

4. An apparatus in accordance with claim 1 wherein said gating means comprises a transistor.

5. An apparatus in accordance with claim 4 wherein said transistor is cut-off in response to the connection of the external power source, thereby decoupling the input of the gating means from the output of the gating means and electrically disconnecting the battery power terminal means from the load, by providing a high resistance path between the battery power terminal means and the load.

6. An apparatus in accordance with claim 1 enclosed in a sealed housing, wherein the battery power terminal means, and the external power terminal means are provided external to said sealed housing.

7. A power supply with a battery disconnect comprising:
    first terminal means for receiving positive battery power from a to be provided battery;
    second terminal means for receiving negative battery power from the battery;
    charging terminal means, electrically isolated from said first and second terminal means, for providing a charge connection to the battery;
    external power terminal means having a positive external power terminal and a negative external power terminal, wherein said external power terminal means receives power from a to be provided external power source;
    charging means for providing a charge path between the negative external power terminal of said external power terminal means and the charging terminal means;
    gating means having an input, an output, and a control input, wherein the input is coupled to the negative external power terminal of said external power terminal means, the output is coupled to the second terminal means, and the control input is coupled to the positive external power terminal of said external power terminal means, wherein the output is decoupled from the input responsive to electrical connection of the external power source to the external power terminal means, and wherein the output is coupled to the input, responsive to disconnection of the external power source from the external power terminal means; and
    a load having a first load terminal and a second load terminal, wherein the first load terminal is coupled to the first terminal means and the positive external power terminal of said external power terminal means, wherein the second load terminal is coupled to the input of said gating means and the negative external power terminal of said external power terminal means, and wherein said load receives operative power from either said external power source through said positive external power terminal and said negative external power terminal, or the battery through said first terminal means and the input of said gating means, and wherein said charging means permit the charging of a secondary battery coupled to said first terminal means, said second terminal means, and said charging terminal means, responsive to the connection of the external power source, and said gating means prevents the charging of a primary battery connected to said first terminal means and said second terminal means, responsive to the connection of the external power source.

8. An apparatus in accordance with claim 7 wherein said charging means comprises a resistor.

9. An apparatus in accordance with claim 7 wherein said gating means comprises a transistor.

10. An apparatus in accordance with claim 9 wherein said transistor is saturated in response to the disconnection of the external power source and provides a low resistance path between the second terminal means and the second load terminal of said load, thereby coupling the input of the gating means to the output of the gating means and electrically connecting the second terminal means to the second load terminal of said load.

11. An apparatus in accordance with claim 10 wherein said transistor is cut-off in response to the connection of the external power source, thereby decoupling the input of the gating means from the output of the gating means and electrically disconnecting the second terminal means from the load, by providing a high resistance path between the first and second terminal means and said load.

12. An apparatus in accordance with claim 9 wherein said transistor is cut-off in response to the connection of the external power source, thereby decoupling the input of the gating means from the output of the gating means and electrically disconnecting the second terminal means from the load, by providing a high resistance path between the first and second terminal means and said load.

13. An apparatus in accordance with claim 7 enclosed in a sealed housing, wherein the first terminal means, the second terminal means, the charging terminal means, the positive external power terminal, and the negative external power terminal are provided external to said sealed housing.

14. A power supply with a battery disconnect comprising:
    a positive battery terminal for receiving positive battery power from a to be provided battery;
    a negative battery terminal for receiving negative battery power from the battery;

a charging terminal, electrically isolated from said positive and negative battery terminals, for providing a charge connection to the battery;

external power terminal means having a positive external power terminal and a negative external power terminal, wherein said external power terminal means receives power from a to be provided external power source;

a resistor for providing a charge path between the negative external power terminal of said external power terminal means and the charging terminal;

a gate having an input, an output, and a control input, wherein the input is coupled to the negative external power terminal of said external power terminal means, the output is coupled to the negative battery terminal, and the control input is coupled to the positive external power terminal of said external power terminal means, wherein the output is decoupled from the input responsive to electrical connection of the external power source to the positive external power terminal and the negative external power terminal, and wherein the output is coupled to the input, responsive to disconnection of the external power source from the positive external power terminal and the negative external power terminal;

a diode having an anode and a cathode, the anode connected to the positive external power terminal of said external power terminal means; and a load having a first load terminal and a second load terminal, wherein the first load terminal is coupled to the positive battery terminal and the cathode of said diode, wherein the second load terminal is coupled to the input of said gate and the negative external power terminal of said external power terminal means, and wherein said load receives operative power from either said external power source through said positive external power terminal and said negative external power terminal, responsive to the connection of the external power source, or the battery through said positive battery terminal and the input of said gate, responsive to the disconnection of the external power source and the provision of the battery, and wherein the gate and the charging terminal permit the charging of a secondary battery connected to said positive battery terminal, said negative battery terminal and said charging terminal, responsive to the connection of the external power source, and the gate prevents the charging of a primary battery connected to said positive battery terminal and said negative battery terminal, responsive to the connection of the external power source.

15. An apparatus in accordance with claim 14 wherein said gate comprises a transistor.

16. An apparatus in accordance with claim 15 wherein said transistor is saturated in response to the disconnection of the external power source and provides a low resistance path between the negative battery terminal and the second load terminal of said load, thereby coupling the input of the gate to the output of the gate and electrically connecting the negative battery terminal to the second load terminal of said load.

17. An apparatus in accordance with claim 16 wherein said transistor is cut-off in response to the connection of the external power source, thereby decoupling the input of the gate from the output of the gate and electrically disconnecting the negative battery terminal from the load, by providing a high resistance path between the negative battery terminal and the second load terminal of said load.

18. An apparatus in accordance with claim 15 wherein said transistor is cut-off in response to the connection of the external power source, thereby decoupling the input of the gate from the output of the gate and electrically disconnecting the negative battery terminal from the load, by providing a high resistance path between the negative battery terminal and the second load terminal of said load.

19. An apparatus in accordance with claim 16 enclosed in a sealed housing, wherein the positive battery terminal, the negative battery terminal, the charging terminal, the positive external power terminal, and the negative external power terminal are provided external to said sealed housing.

* * * * *